United States Patent [19]

Mowill

[11] E Patent Number: Re. 32,756

[45] Reissued Date of Patent: Sep. 27, 1988

[54] PRE-SWIRL INLET GUIDE VANE FOR COMPRESSOR

[75] Inventor: Rolf J. Mowill, Oslo, Norway

[73] Assignee: A/S Kongsberg Vapenfabrikk, Norway

[21] Appl. No.: 610,511

[22] Filed: May 15, 1984

Related U.S. Patent Documents

Reissue of:

[64] Patent No.: 4,428,714
Issued: Jan. 31, 1984
Appl. No.: 293,869
Filed: Aug. 18, 1981

[51] Int. Cl.[4] ..... F01D 17/16

[52] U.S. Cl. ..... 415/161

[58] Field of Search ..... 415/119, 151, 159–164, 415/165; 60/226.1, 226.3, 262

[56] References Cited

U.S. PATENT DOCUMENTS

| | | | |
|---|---|---|---|
| 1,948,478 | 2/1934 | Biggs | 415/141 |
| 2,733,853 | 2/1956 | Trumpler | 415/161 |
| 2,838,274 | 6/1958 | Fletcher et al. | 415/161 |
| 2,914,241 | 11/1959 | Novak | 415/162 |
| 3,074,689 | 1/1963 | Chapman | 415/161 X |
| 3,151,841 | 10/1964 | Henny | 415/161 X |
| 3,442,493 | 5/1969 | Smith | 415/161 X |
| 3,546,882 | 12/1970 | Berkey | 60/226.1 X |
| 3,588,270 | 6/1971 | Boelcs | 415/149 R |
| 3,723,021 | 3/1973 | Bartholomew | 415/160 X |
| 3,769,790 | 11/1973 | Thebert | 60/39.08 |
| 3,799,694 | 3/1974 | Duzan | 415/149 R |
| 3,992,128 | 11/1976 | Lunsford et al. | 415/161 |
| 4,053,256 | 10/1977 | Hertel | 415/161 |

FOREIGN PATENT DOCUMENTS

| | | |
|---|---|---|
| 868713 | 1/1942 | France . |
| 2458273 | 6/1976 | Fed. Rep. of Germany . |
| 2502986 | 7/1976 | Fed. Rep. of Germany . |
| 2403113 | 8/1978 | Fed. Rep. of Germany . |

*Primary Examiner*—Robert E. Garrett
*Assistant Examiner*—Joseph M. Pitko
*Attorney, Agent, or Firm*—Finnegan, Henderson, Farabow, Garrett & Dunner

[57] ABSTRACT

Two sets of guide vanes are positioned in the combustion air flow path in the inlet duct of a rotary compressor of a gas turbine engine for controllably varying the air mass flow rate according to turbine load conditions. The upstream set which provides a fixed, initial degree of swirl relative to compressor rotational direction and axis and the controllably moveable downstream set which provides a final degree of swirl cooperate to provide controllable swirl over the range of about 0° to 32° in the inlet air incident upon the turbine blades. The two guide vane sets are separated by a distance sufficient to allow turbulence induced by the first set to fully decay before the second set is encountered.

20 Claims, 2 Drawing Sheets

PRE-SWIRL INLET GUIDE VANE FOR COMPRESSOR

Matter enclosed in heavy brackets [ ] appears in the original patent but forms no part of this reissue specification; matter printed in italics indicates the additions made by reissue.

BACKGROUND OF THE INVENTION

1. Field of the Invention

The present invention involves improvements in apparatus and methods for controlling mass flow rate in rotary compressors, particularly compressors used in recuperated gas turbine engine applications.

2. Description of the Prior Art

The power output of conventional gas turbine engines can be varied by changing the turbine inlet temperatures, such as by reducing fuel flow. However, it is known that substantial increases in the part load efficiency can be achieved if the mass flow rate of the combustion air is reduced to maintain high turbine inlet temperatures, particularly in recuperated gas turbine engine applications. It is also known that precise control of the combustion temperature can lead to reductions in the amount of undesirable hydrocarbon and nitrogen oxide emissions.

Previous attempts to change or control the air mass flow rate in externally driven compressors, such as compressors driven by an electric motor or compressor section of gas turbine electrical power generator units, involve the use of guide vanes in the compressor inlet that are moveable to induce swirl to the incoming air to change the angle at which the inlet air enters the compressor blades. Most compressors are designed to have blade shapes and angles of attack orientation selected to obtain optimum mass flow rate at rated speed. These design point conditions generally presuppose inlet air incident at a fixed, predetermined angle relative to the axis of rotation. Inlet air flow incident at angles different from the design value, such as where swirl is introduced or the amount of swirl is changed, causes the mass flow rate through the apparatus to change from the design value.

A problem with conventional swirl-inducing guide vane apparatus used to vary the mass flow rate in compressors is that the maximum degree of turning or swirl achievable without substantial separation with a single set of vanes is approximately 15°, while variations in the swirl angle of about 30° may be desirable in certain applications, such as compressors used in gas turbine engines, in order to achieve high thermal efficiency throughout the entire operating range. Although moveable vanes with turning angles greater than about 15° have been attempted, these are susceptible to severe separation and consequent losses. Various attempts have been made to circumvent this problem such as by the use of two-piece articulated vanes having a fixed leading portion and a moveable trailing or tail portion. Another proposed solution utilizes two sets of vanes, a fixed set immediately upstream of a moveable set to achieve essentially the same function as the articulated vanes. These solutions are not satisfactory as less than the desired range of turning can be achieved in practice commensurate with the requirement for a reasonably low aerodynamic loss.

SUMMARY OF THE INVENTION

It is believed that the deficiencies of the prior art stem in large part from the close aerodynamic coupling between the front and rear portions of the articulated vanes and between the upstream and downstream separate sets of guide vanes. While it is believed that the reason for the deliberately close coupling in the prior art was to take advantage of the known flow profile incident upon the downstream vane portion or vane set, the lack of smooth, undisturbed streamline flow on the downstream elements can result in unwanted turbulence and premature boundary layer separation leading to high losses in turning conditions. The losses imposed on the air flow could also be substantial in the non-turning conditions because of the proximity of the fixed vanes to the compressor blades. The improvements of the present invention are intended to circumvent these problems.

In accordance with the purpose of the invention, as embodied and broadly described herein, the improvement in rotary apparatus for compressing a compressible fluid of the kind having a plurality of compressor blades mounted on a rotating hub positioned in a compressor housing, a preferred fluid flow path extending through the housing, the housing having a duct portion extending upstream of the compressor blades relative to the fluid flow path and determining, in part, the fluid flow path, comprises means for controllably varying the fluid mass flow rate through the compressor including a first set of guide vanes in the duct for imparting an initial degree of swirl to the fluid entering the duct relative to the direction of rotation of the compressor hub; and a second set of guide vanes positioned in the duct upstream of the compressor blades, the vanes of the second set being moveable about their axes, the second vane set being positioned a distance downstream of the first vane set along the fluid flow path sufficient to permit substantial decay of the turbulence imparted to the flowing fluid by the first vane set prior to the swirling fluid reaching the second, moveable vane set, the second moveable vane set for changing the degree of swirl in the fluid to a final degree of swirl corresponding to a desired compressor fluid mass flow rate.

Preferably, the first vane set is fixed, and the individual guide vanes in the first vane set are configured and oriented to impart about +10° to +15° of swirl to the incoming fluid relative to the axis and direction of rotation of the compressor.

It is further preferred that the first vane set and the second moveable vane set cooperate to provide final fluid swirl of from about 0° to +32° at the inlet to the compressor blades, relative to the axis and direction of rotation of the compressor.

Also in accordance with the present invention, as embodied and broadly described herein, the method of throttling the compressible fluid mass flow rate through a rotary compressor of the kind having a plurality of compressor blades on a rotating hub and having an inlet region including a duct determining, in part, the flow path of the incoming fluid to the compressor blades, comprises the steps of imparting a first, initial degree of swirl to the incoming fluid relative to the axis and direction of rotation of the compressor; removing turbulence in the swirling fluid induced by the initial swirl imparting step; and imparting a second, controllably variable degree of swirl to the swirling fluid to change the degree of swirl in the fluid to a desired value prior to admitting the fluid to the compressor blades, the aforementioned steps being accomplished in the compressor inlet region.

The accompanying drawing, which is incorporated in and constitutes a part of this specification, illustrates one embodiment of the invention and, together with the description, serves to explain the principles of the present invention.

DESCRIPTION OF THE PREFERRED EMBODIMENT

Reference will be made in detail to the present preferred embodiment of the invention, an example of which is illustrated in the accompanying drawing.

Figure 1:
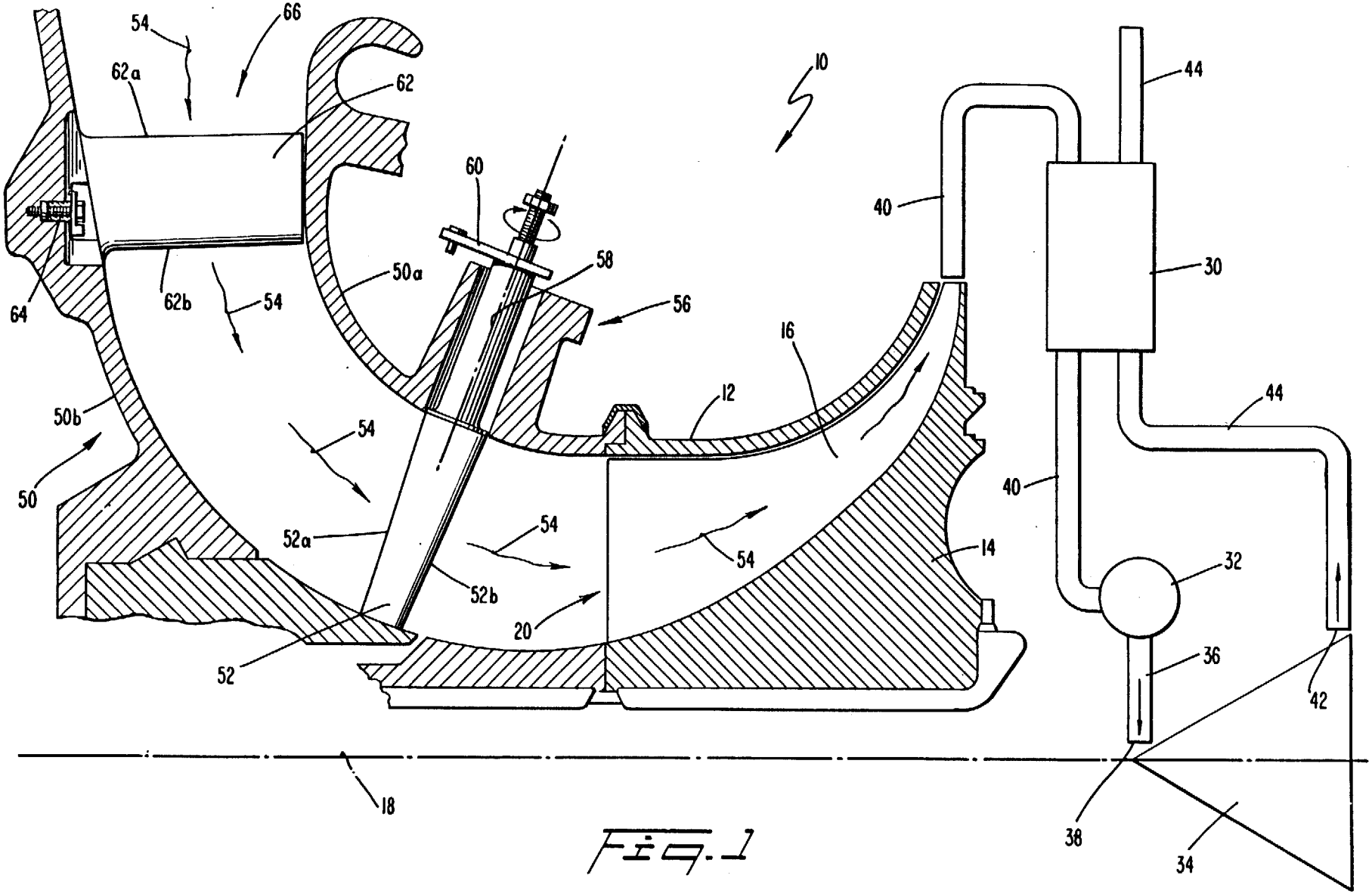
FIG. 1 is a schematic view of the improvements in the compressor apparatus associated with a single shaft gas turbine engine, which improvements constitute the present invention.

Referring to FIG. 1, there is shown generally a single shaft compressor 10 used to increase the pressure of a gaseous fluid such as air. Compressor 10 includes a housing 12 surrounding a hub 14 on which are mounted compressor blades 16. Hub 14 is rotatable about axis 18 (illustrated schematically in the Figure). Compressor 10 is shown in FIG. 10 to be of the centrifugal type, with the entrance 20 to the compressor blades 16 predominantly in the axial direction in relation to the axis 18 and with the compressor gas leaving compressor 10 at exit 22 substantially in the radial direction. However, the improvements of the present invention are not restricted to use with centrifugal compressors, and the scope of the present invention inludes axial compressors as well as mixed axial and radial flow compressor devices.

The improvements constituting the present invention enable the pressure ratio and the mass flow rate to the compressor 10 to be controlled essentially independent of the compressor rotational speed. This is an especially important advantage in certain applications such as where the compressor is driven at essentially constant speed such as by a synchronous device or where, such as shown in FIG. 1, the compressor is used in a recuperated single shaft gas turbine engine application. The present invention also can be utilized to advantage in a two shaft machine because although some decrease in the gas mass flow rate occurs with the decrease in rotational speed of the gas generator in such machines, additional reductions can be achieved using the present invention.

Thus, FIG. 1 shows compressor 10 associated with heat exchanger 30, combustor 32 and turbine 34, all illustrated schematically. According to well-known principles, the compressed air emanating from the compressor exit 22 is channeled by appropriate ducting 40 through heat exchanger 30 where it is heated prior to admission to combustor 32, such as by the exhaust gases channeled from exit 42 of turbine 34 by ducting 44. The heated compressed air is then combusted with fuel in combustor 32 and the combustion gases are conveyed by ducting 36 and admitted to the turbine 34 at turbine inlet 38 for subsequent expansion and extraction of mechanical work. Turbine 34 is shown co-axial with axis 18 of compressor 10, but other configurations are available depending upon the particular application.

It is understood that the aforementioned heat exchanger 30, and ducting 36, 40, 44 may be constructed as integral parts of housing 12 and/or the turbine housing (not shown) and are depicted as separate components in FIG. 1 merely for convenience of description. Also, the preheating of the compressed air can be accomplished by channeling the compressed air emanating from compressor exit 22 past various structural components such as the combustor 32 housing (not shown) and the turbine housing for cooling these components. Although such an arrangement may not have all the thermodynamic advantages of a fully recuperated gas turbine engine, other advantages, such as extended lifetimes for structural and rotating components and better control over hydrocarbon and nitrogen oxide (NOX) emissions, may be achieved. For example, it is desirable to utilize lean burning combustors to control NOX emissions but this requires precisely controlling the fuel/air ratio over the entire operating range. It is far easier to control the fuel/air ratio if the air mass flow rate can be controlled during part load operation, such as by use of the present invention. Thus, the scope of the present invention is intended to include these latter applications as well as the recuperated gas turbine engine application depicted in FIG. 1.

In accordance with the present invention, means are provided for controllably varying the fluid mass flow rate through the compressor, the means including a set of final, moveable guide vanes positioned upstream of the compressor blades. As embodied herein, compressor housing 12 has an inlet duct portion 50 extending upstream of compressor blades 16 along the inlet air flow path through the compressor 10 (designated by arrows 54). Duct 50 is shown as having a shroud side 50a, a hub side 50b, and an air inlet 66. A set of guide vanes 52 having leading edges 52a and trailing edges 52b are positioned in compressor inlet duct 50 upstream of compressor blade 16, and the function of vanes 52 is to impart a final controllably variable degree of swirl to the fluid in flow path 54, relative to the direction of rotation of hub 14 on compressor axis 18, the final degree of swirl corresponding to the desired compressor mass flow rate. Vanes 52 are attached to duct 50 by blade mounting assembly 56 which provides for rotational movement of vanes 52 about the respective vane longitudinal axis 58 such as to present a varying angle of attack to the incident air flow 54. Changes in the angular orientation of vanes 52 about axis 58 are accomplished through the lever assembly 60 attached to vanes 52, but any suitable mechanical, hydraulic or other actuating mechanism can be used. Actuating mechanisms such as lever assembly 60 can be automatically controlled by conventional controller means (not shown) in accordance with desired operating conditions, or would be immediately evident to those skilled in the art.

Preferably, the vanes 52 are positioned in duct 50 adjacent the compressor entrance 20 and proximate compressor blades 16 along flow path 54 for the following reasons. Vanes 52, however, should be spaced from compressor blades 16 a distance sufficient to allow any wake generated in the inlet air by vanes 52 to close before the inlet air reaches blades 16. The final flow profile incident upon compressor blades 16 will be determined by vanes 52 as will be discussed hereinafter, and the proximity of vanes 52 to compressor blades 16 will secure definition of the final swirl profile insofar as there will be minimal interaction with housing portion 50. It is also preferred for essentially the same reasons that vanes 52 be located in a region of duct 50 wherein the average streamline velocity at the leading edge of the vanes is at least about 70% and, more preferably, more than about 80% of the average streamline velocity at compressor entrance 20.

In accordance with the present invention, there is further provided a set of initial guide vanes for imparting an intial degree of swirl to the inlet air entering the compressor, relative to the axis and direction of rotation of the compressor, thus dividing or sharing the total turning between the two separate sets of guide vanes. As embodied herein, vanes 62 are positioned in duct 50 upstream of movable vanes 52 along flow path 54 and near air inlet region 66. Thus, the inlet air entering compressor 10 along flow path 54 at inlet 66 is influenced first by guide vanes 62 and then second by guide vanes 52 before being admitted to the compressor blades 16.

Preferably, the vanes 62 present to the air flow entering the duct 50 at inlet 66 along flow path 54 an angle of attack that remains constant in time during operation of the compressor 10 over the entire range of load conditions, although the angle may vary spatially along the vane axis to achieve a desired aerodynamic flow pattern in a particular inlet duct configuration. For instance, in the configuration for duct 50 shown in FIG. 1, the velocities near the shroud side 50a will be higher than the inlet air velocities near the hub side 50b. Thus, the portion of the vane 62 near the hub side may have a greater angle of attack than the shoud side portion giving rise to a "twist" in the profile of vanes 62. Vanes 52 can also have a twist to further match the incident flow profile, that is, to provide a spatially constant angle of attack to the air flow incident from vanes 62. In general, the "twist" in vanes 52 will be less than that in vanes 62.

To achieve an angle of attack that is constant in time, the vanes 62 can be permanently fixed in duct 50 such as by making them an integral housing structural member or can be attached by suitable fastening means. As shown in FIG. 1, the vanes 62 are fastened by bolting mechanism to permit adjustment changes in the angle of attack of the vanes 62 during initial assembly of the gas turbine apparatus or during subsequent servicing outages, in order to achieve optimum results.

Importantly, the distance between initial guide vanes 62 which impart a constant degree of initial swirl to the inlet air and the final, moveable guide vanes 52 which impart a final degree of swirl to the inlet air, depending upon operating load condition, is such as to permit the turbulence induced by vanes 62 to become essentially decayed in order to provide substantially invariant streamline flow across the flow area of flow path 54 immediately upstream of vanes 52. This positioning enables moveable vanes 52 to be aerodynamically decoupled from the guide vanes 62 to the extent that premature boundary layer separation on vanes 52 will not be induced by asymmetrical, undecayed wake from vanes 62.

It is estimated that spacing the trailing edges 62b of vanes 62 from the leading edges 52a of vanes 52 a distance of greater than or equal to about one chord length of vanes 62 should provide essentially fully decayed turbulent flow incident upon vanes 52. Preferably, vanes 62 should be located in a region of relatively low air flow velocities so that the full load losses are small and on the order of about less than 30% of the average streamline flow velocity at compressor entrance 20 and, more preferably, less than about 10%. For reasonable duct configurations, such as shown in FIG. 1, this requirement entails a physical separation distance of at least one chord length of vane 62 and usually two to three chord lengths, thus ensuring fully decayed flow at the leading edges 52a.

In the centrifugal apparatus disclosed in FIG. 1, vanes 62 are located in the inlet region 66 of inlet duct 50. The flow path 54 in inlet 66 is predominantly in the radial direction. Moveable guide vanes 52 are located at the exit of inlet duct 50 near compressor entrance 20 in a region where the flow path 54 is predominantly axial and where average streamline flow velocities on the order of about 250 meters/second occur. One skilled in the art could determine without undue analysis or experimentation an appropriate separation distance for a given compressor inlet duct configuration given the present disclosure.

Figure 2A:
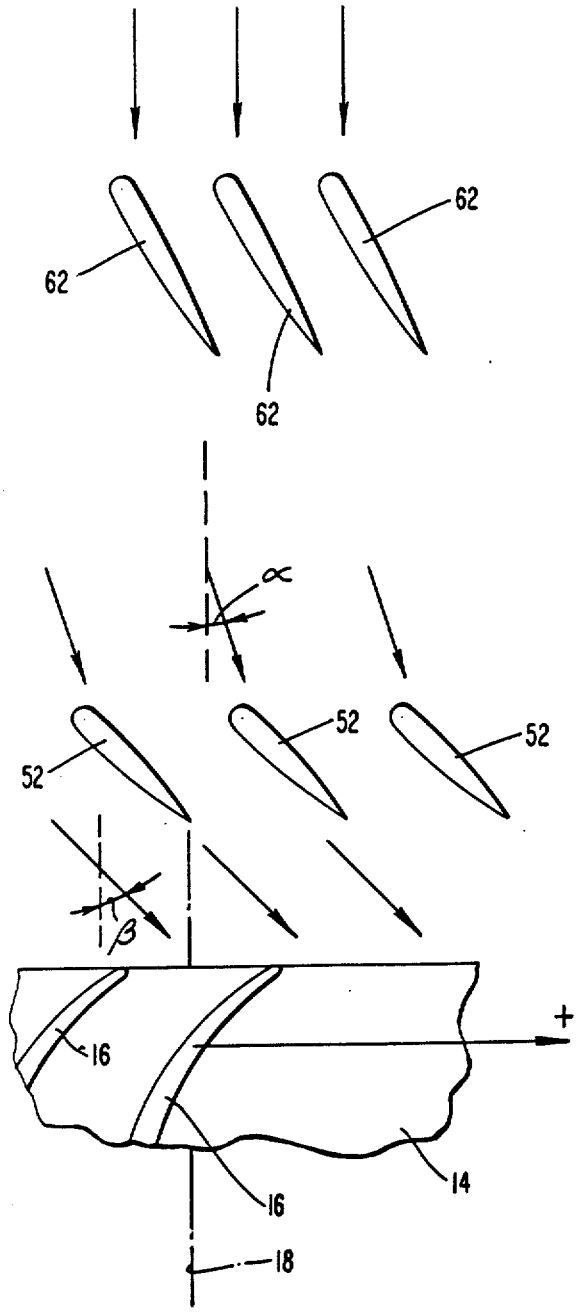
FIG 2a is a schematic showing the inlet air flow path through the compressor section for low power operation of the gas turbine engine shown in FIG. 1.
Figure 2B:
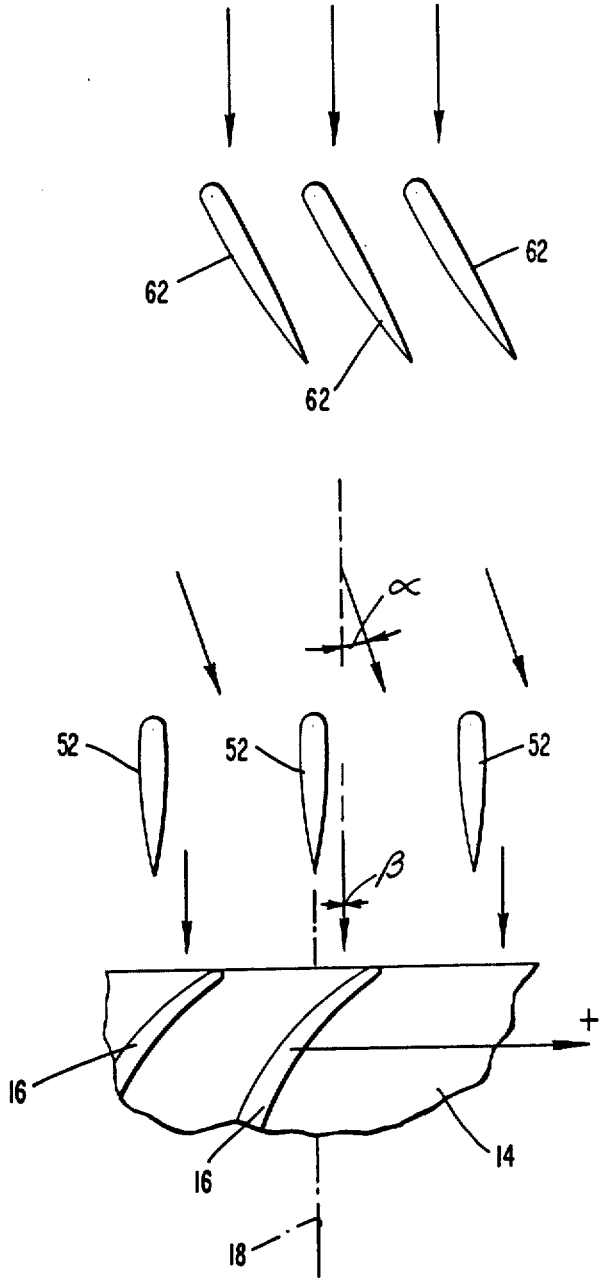
FIG. 2b is a schematic showing the inlet air flow path through the improved compressor of FIG. 1 at high turbine power operations.

It is also preferred that the guide vanes 62 are configured and oriented in inlet duct 50 to impart about $+10°$ to 30 15° of initial swirl to the incoming fluid under all turbine load conditions, the degree of initial swirl being measured immediately upstream of vanes 52 along flow path 54, relative to the axis 18, and with the direction of rotation of hub 14 establishing the positive direction. With reference to FIGS. 2A and 2B, the angle of initial swirl is shown by the angle which is positive as it is in the direction of rotation of hub 14 (designated by arrows).

It is still further preferred that the moveable vanes 52 are configured and oriented by a lever assembly 60 to impart a further final degree of swirl to the inlet air such that the final degree of swirl in the fluid incident upon the compressor blades 16 (represented by the angle in FIGS. 2A and 2B) ranges from about 0° to $+32°$ for the maximum and minimum turbine load conditions, respectively. For the apparatus in FIG. 1, guide vanes 52 should be capable of changing the relative direction of the air incident on vanes 52 from vanes 62 from about $-20°$ to $+20°$ depending upon the turbine load.

With specific reference to FIGS. 2A, 2B which depict the invention being used in the compressor component of a gas turbine engine operating at minimum and maximum load conditions, respectively, it is clear that the orientation of vanes 52 at minimum turbine load is such as to increase the positive degree of swirl induced by vanes 62 while at maximum load conditions the orientation of moveable vanes 52 is such as to impart negative swirl to eliminate or correct the final degree of swirl in the combustion air to the 0° maximum load design condition for the compressor 10 shown in FIG. 1. If the particular turbine apparatus includes a compressor having a design point with a finite, non-zero (positive or negative) degree of swirl, the preferred ranges of the settings for initial set of vanes 62 and final, moveable vanes 52 would be adjusted accordingly, as would be evident to one skilled in the art upon reading this disclosure.

Because of the aerodynamically decoupled nature of the relationship between vanes 62 and moveable vanes 52, a certain amount of analysis and/or experimentation will be necessary in a particular application to determine the angular settings and twists of vanes 62 and vanes 52 needed to effect the desired final degree of swirl at the entrance to compressor blades 16, particularly in applications such as shown in FIG. 1 wherein the compressor inlet duct 50 contains substantial changes in the flow path 54 direction between vanes 62 and 52. However, the penalties in terms of increased design cost are outweighted by the expected increase in overall efficiency of the turbine unit, particularly at low load conditions where large final swirl angles can be achieved on stable basis. This increased low load efficiency also is expected to outweigh the slight degradation in performance at the maximum or design load due to the additional pressure drops incurred in inlet duct 50 to, in effect, first induce swirl and then remove the swirl in the inlet air incident upon compressor 16. Although the use of moveable vanes for vanes 62 would overcome this deficiency, and is considered within the scope of the present invention, the extra complexity makes such an embodiment not as preferable as the fixed vane 62 embodiment shown and described herein.

It will be apparent to those skilled in the art that various modifications and variations could be made in the improved means for controlling the mass flow rate in a compressor and the corresponding improved method for achieving control of the mass flow rate without departing from the scope or spirit of the invention.

What is claimed is:

1. In rotary apparatus for compressing a compressible fluid of the kind having a plurality of compressor blades mounted on a rotating hub positioned in a compressor housing, a preferred fluid flow path extending through the housing, the housing having a duct portion extending upstream of the compressor blades relative to the fluid flow path [and] *, with substantially all the fluid flowing through the duct being guided to the compressor blades, with the duct* determining, in part, the fluid flow path, the improvement comprising:

means for controllably varying the fluid mass flow rate through the compressor including:

(a) a first set of guide vanes [in] *positioned substantially within* the duct for imparting an initial degree of swirl to the fluid entering the duct relative to the axis and direction of rotation of the compressor hub; and (b) a second set of guide vanes positioned [in] *within* the duct upstream of the compressor blades, the vanes of the said second set being moveable about their axes, said second vane set being positioned a distance downstream of said first vane set along the preferred fluid flow path wherein at least about one first vane chord length separates the trailing edges of said first vane set from the leading edges of said second, moveable vane set, to permit substantial decay of the turbulence imparted to the flowing fluid by said first vane set prior to said swirling fluid reaching said second, moveable vane set, said second, moveable vane set for changing the degree of swirl in the fluid to a final degree of swirl incident upon the compressor blades corresponding to a desired compressor fluid mass flow rate, *said first vane chord length being measured at the widest part of said first vane, and said separation existing along substantially the entire axial length of said first and said second vanes.*

2. Apparatus as in claim 1 wherein the separation distance is about 2–3 lengths.

3. In rotary apparatus for compressing a compressible fluid of the kind having a plurality of compressor blades mounted on a rotating hub positioned in a compressor housing, a preferred fluid flow path extending through the housing, the housing having a duct portion extending upstream of the compressor blades relative to the fluid flow path and determining, in part, the fluid flow path, the improvement comprising:

means for controllably varying the fluid mass flow rate through the compressor including:

(a) first set of guide vanes in the duct for imparting an initial degree of swirl to the fluid entering the duct relative to the axis and direction of rotation of the compressor hub; and (b) a second set of guide vanes positioned in the duct upstream of the compressor blades, the vanes of the said second set being moveable about their axes, said second vanes set being positioned a distance downstream of said first vane set along the preferred fluid flow path sufficient to permit substantial decay of the turbulence imparted to the flowing fluid by said first vane set prior to said swirling fluid reaching said second, moveable vane set, said second, moveable vane set for changing the degree of swirl in the fluid to a final degree of swirl incident upon the compressor blades corresponding to a desired compressor fluid mass flow rate, wherein said first vane set is positioned in a region of the duct having average streamline fluid velocities of less than about 30% of the average streamline velocities at the compressor blades, and wherein said second, moveable vane set is positioned in a region of the duct having average streamline fluid velocities of at least about 70% of the average streamline fluid velocities at the compressor blades.

4. Apparatus as in claim 3 wherein said first vane set is positioned in a region of the duct having average streamline fluid velocities less than about 10% of the average streamline velocities at the compressor blades.

5. Apparatus as in claim 3 wherein said second, moveable vane set is positioned in a region of the duct having average streamline fluid velocities of greater than about 80% of the average streamline fluid velocities at the compressor blades.

6. Apparatus as in claim 1 or 3 wherein said second, moveable vane set is positioned upstream of and adjacent to the compressor blades.

7. Apparatus as in claim 1 or 3 wherein the duct has a predominantly radial inlet portion and a predominantly axial exit portion, the fluid flow path undergoing a substantial angular change in direction through the compressor inlet, and wherein said first vane set is located in said inlet portion and said second moveable vane set is located in said exit portion.

8. Apparatus as in claim 1 or 3 wherein the individual guide vanes in said first vane set are configured to impart about $+10°$ to $+15°$ of swirl to the incoming fluid relative to the axis and direction of rotation of the compressor hub.

9. Apparatus as in claim 8 wherein said first vane set and said second, moveable vane set cooperate to provide final fluid swirl of from about $0°$ to $+32°$ at the inlet to the compressor blades, relative to the axis and direction of rotation of the compressor hub.

10. Apparatus as in claim 1 or 3 wherein the individual guide vanes in said second, moveable vane set are moveable to change direction in the fluid incident there-upon by about $-20°$ to $+20°$, the direction of rotation of the compressor hub establishing the positive direction.

11. Apparatus as in claim 1 or 3 wherein said first vane set is essentially fixed.

12. In an air-breathing, variable load recuperated gas turbine engine of the kind having a rotary compressor section for compressing the air for combustion, a combustor for combusting the compressed air with fuel to produce combustion gases, a turbine for recovering mechanical work from the combustion gases, and apparatus for recovering heat valves from the combustion gases and heating the compressed air prior to combustion using the recovered heat values, the compressor further including a plurality of compressor blades mounted on a rotating hub positioned in a compressor housing, the compressor housing having a preferred air flow path extending therethrough, and also having a duct portion extending upstream of the compressor blades relative to the air flow path, the duct determining, in part, the air flow path, the improvement comprising:

means for controllably varying the air mass flow rate through the compressor and to the combustor to maintain highest possible turbine section inlet temperatures over varying turbine load conditions, the air mass flow rate varying means including (a) a first set of guide vanes in the duct for imparting an initial degree of swirl to the fluid entering the compressor housing inlet relative to the axis and direction of rotation of the compressor hub; and (b) a second set of guide vanes positioned in the duct upstream of the compressor blades, the vanes of said second set being moveable about their axes, said second vane set being positioned a distance downstream of said first vane set along the fluid flow path wherein at least about one first vane chord length separates the trailing edges of said first vane set from the leading edges of said second, moveable vane set, to permit substantial decay of the turbulence imparted to the flowing fluid by said first vane set prior to said swirling fluid reaching said second, moveable vane set, said second, moveable vane set for changing the degree of swirl in the fluid to a final degree of swirl corresponding to a predetermined turbine load condition, wherein said first vane set is positioned in a region of the duct having average streamline fluid velocities of less than about 30% of the average streamline velocities at the compressor blades, and wherein said second, moveable vane set is positioned in a region of the duct having average streamline fluid velocities of at least about 70% of the average streamline fluid velocities at the compressor blades.

13. A method of throttling the compressible fluid mass flow rate through a rotary compressor of the kind having a plurality of compressor blades on a rotating hub and having an inlet region including a duct determining, in part, the preferred flow path of the incoming fluid to the compressor blades *with substantially all the fluid flowing in the duct being guided to the compressor blades*, the method comprising the steps of:

(a) imparting a first, initial degree of swirl to the incoming fluid relative to the axis and direction of rotation of the compressor;

(b) removing turbulence in the swirling fluid induced by said initial swirl imparting step; and (c) imparting a second, controllably variable degree of swirl to the swirling fluid to change the degeee of swirl in the fluid to a desired final value prior to admitting the fluid to the compressor blades, steps (a)-(c) being accomplished [in] *substantially within* the duct, wherein said removing step includes performing said first swirl imparting step using a first set of guide vane at a location along the preferred fluid flow path a distance of at least one first vane chord length upstream of the location where said second variable swirl imparting step is performed to allow the induced turbulence to decay naturally, *said first vane chord length being measured at the widest part of said first vane, and said distance existing along substantially the entire axial length of said first vane relative to said variable swirl step location.*

14. A method of throttling the compressible fluid mass flow rate through a rotary compressor of the kind having a plurality of compressor blades on a rotating hub and having an inlet region including a duct determining, in part, the preferred flow path of the incoming fluid to the compressor blades, the method comprising the steps of:

(a) imparting a first, initial degree of swirl to the incoming fluid relative to the axis and direction of rotation of the compressor;

(b) removing turbulence in the swirling fluid induced by said initial swirl imparting step; and (c) imparting a second, controllably variable degree of swirl to the swirling fluid to change the degree of swirl in the fluid to a desired final value prior to admitting the fluid to the compressor blades, steps (a)-(c) being accomplished in the duct, wherein said second, variable swirl imparting step is carried out in a region of average streamline fluid velocities of at least about 70% of the average streamline fluid velocities at the compressor blades, and wherein said first swirl imparting step is carried out in a region of average streamline fluid velocities of less than about 30% of the average streamline flow velocities of the compressor blades.

15. The method as in claims 13 or 14 wherein said second, variable swirl imparting step is accomplished by variable angle guide vane means positioned in the fluid flow path, and wherein said first set of guide vanes is positioned in the duct upstream of the variable guide vane means.

16. The method as in claim 13 or 14 wherein about $+10°$ to $+15°$ of swirl relative to the axis and direction of rotation are imparted to the incoming fluid in said first swirl imparting step, measured immediately upstream of the location in the fluid flow path where the second, variable swirl imparting step is carried out.

17. The method as in claim 13 or 14 wherein said second, variable swirl imparting step changes the direction of the incident fluid from about $-20°$ to $+20°$.

18. The method as in claim 13 or 14 wherein said second, variable swirl imparting step together with said first swirl imparting step provide a final swirl of between about $0°$ to $+32°$ prior to admitting the fluid to the compressor blades.

19. The method as in claim 13 or 14 wherein the duct has a predominately radial inlet portion and a predominately axial exit portion, said first swirl imparting step being carried out in the inlet portion and said second, variable swirl imparting step being carried out in the exit portion.

20. An improved method of throttling inlet air flow rate to the combustor in a recuperated gas turbine engine of the type having a rotary compressor with a plurality of compressor blades on a rotating hub and with an inlet region including a duct determining, in part, the flow path of the incoming air to the compressor blades, for maintaining a highest possible turbine inlet temperature over variable load conditions, the improvement comprising the steps of:

(a) imparting a first, initial degree of swirl to the incoming air relative to the axis and direction of rotation of the compressor;

(b) removing turbulence in the incoming air induced by said preliminary swirl imparting step; and (c) imparting a second, variable degree of swirl to the incoming air to change the degree of swirl in the air to a final desired value corresponding to a predetermined turbine load condition prior to admitting the air to the compressor blades, said steps (a)-(c) being accomplished in the duct, wherein said removing step includes performing said first swirl imparting step using a first set of guide vane and at a location along the preferred fluid flow path a distance of at least one first vane chord length upstream of the location where said second variable swirl imparting step is performed to allow the induced turbulence to decay naturally, wherein said second, variable swirl imparting step is carried out in a region of average streamline fluid velocities of at least about 70% of the average streamline fluid velocities at the compressor blades, and wherein said first swirl imparting step is carried out in a region of average streamline fluid velocities of less than about 30% of the average streamline flow velocities of the compressor blades.

* * * * *